US012627700B2

(12) United States Patent
Inghilterra et al.

(10) Patent No.: US 12,627,700 B2
(45) Date of Patent: May 12, 2026

(54) BEHAVIOR-BASED ASSET CLASSIFICATIONS

(71) Applicant: CrowdStrike, Inc., Sunnyvale, CA (US)

(72) Inventors: Ryan Inghilterra, Carsbad, CA (US); Shaefer Drew, Lynnwood, WA (US); Michael Brautbar, Wayland, MA (US)

(73) Assignee: CrowdStrike, Inc., Sunnyvale, CA (US)

( * ) Notice: Subject to any disclaimer, the term of this patent is extended or adjusted under 35 U.S.C. 154(b) by 181 days.

(21) Appl. No.: 18/545,761

(22) Filed: Dec. 19, 2023

(65) Prior Publication Data

US 2025/0202921 A1     Jun. 19, 2025

(51) Int. Cl.
    *H04L 9/40* (2022.01)
(52) U.S. Cl.
    CPC ................................ *H04L 63/1433* (2013.01)
(58) Field of Classification Search
    CPC ................................................... H04L 63/1433
    See application file for complete search history.

(56) References Cited

U.S. PATENT DOCUMENTS

| | | | | |
|---|---|---|---|---|
| 8,719,942 B2 * | 5/2014 | Figlin | ................. | H04L 63/1408 726/25 |
| 2014/0143863 A1 * | 5/2014 | Deb | .................... | H04L 63/1433 726/22 |

| | | | | |
|---|---|---|---|---|
| 2019/0109848 A1 * | 4/2019 | Clark | ................. | G06F 21/6263 |
| 2019/0342173 A1 * | 11/2019 | Navarro | ............. | H04L 63/1408 |
| 2019/0373436 A1 * | 12/2019 | Garg | ................. | H04L 63/1433 |
| 2021/0168157 A1 * | 6/2021 | Conner | .................. | G06F 21/56 |
| 2021/0282016 A1 * | 9/2021 | Mohan | ............... | H04L 63/1458 |
| 2021/0311639 A1 * | 10/2021 | Kotzur | ................. | G06F 3/0607 |
| 2022/0345478 A1 * | 10/2022 | Nelson | ............... | H04L 63/1441 |
| 2022/0345483 A1 * | 10/2022 | Shua | .................... | H04L 9/0825 |
| 2022/0374524 A1 * | 11/2022 | Pandey | ................ | G06F 21/552 |

FOREIGN PATENT DOCUMENTS

| | | | | |
|---|---|---|---|---|
| CN | 108234435 A * | 6/2018 | ........ | H04L 63/1408 |
| WO | WO-2006070048 A1 * | 7/2006 | ............ | H04L 67/61 |
| WO | WO-2022106885 A1 * | 5/2022 | ........... | H04L 9/3239 |

* cited by examiner

*Primary Examiner* — Sarah Su

(74) *Attorney, Agent, or Firm* — Lee & Hayes, P.C.

(57)                ABSTRACT

Techniques, systems, and computer-readable media for dynamic behavior-based asset classification are described herein. An asset classification system can detect and receive data associated with a host computer, determine, based on the data, a behavior associated with the host computer, assign the host computer a server classification based on the determination that the behavior represents a behavior of focus, and record the assigned server classification associated with the host computer. In various examples, the asset classification system can determine the behavior is a behavior of focus based on one or more of: a number of connections to other computers associated with a shared customer identifier, a number of unique other host computers connecting to the host computer, and/or a number of unique non-local accounts that have logged in to the host computer, and that the host computer has had an inbound connection on a common port.

20 Claims, 6 Drawing Sheets

200

100

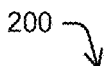

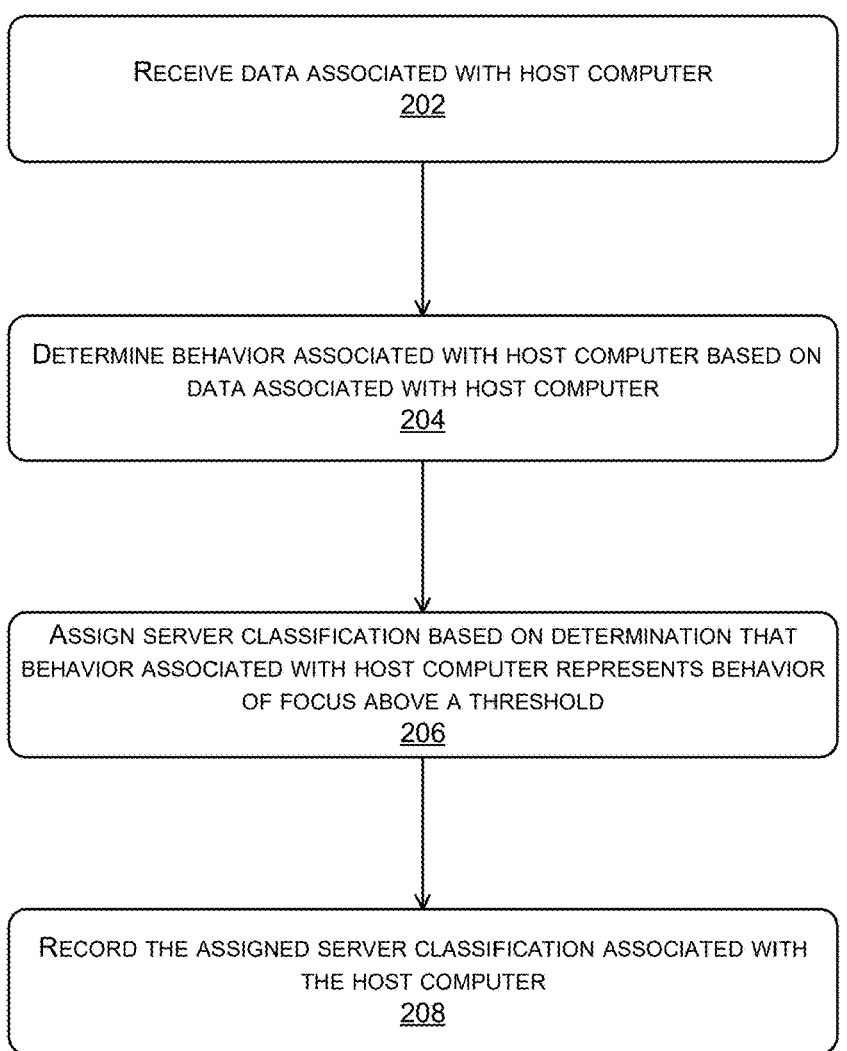

RECEIVE DATA ASSOCIATED WITH HOST COMPUTER
202

DETERMINE BEHAVIOR ASSOCIATED WITH HOST COMPUTER BASED ON
DATA ASSOCIATED WITH HOST COMPUTER
204

ASSIGN SERVER CLASSIFICATION BASED ON DETERMINATION THAT
BEHAVIOR ASSOCIATED WITH HOST COMPUTER REPRESENTS BEHAVIOR
OF FOCUS ABOVE A THRESHOLD
206

RECORD THE ASSIGNED SERVER CLASSIFICATION ASSOCIATED WITH
THE HOST COMPUTER
208

FIG. 2

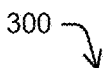

300

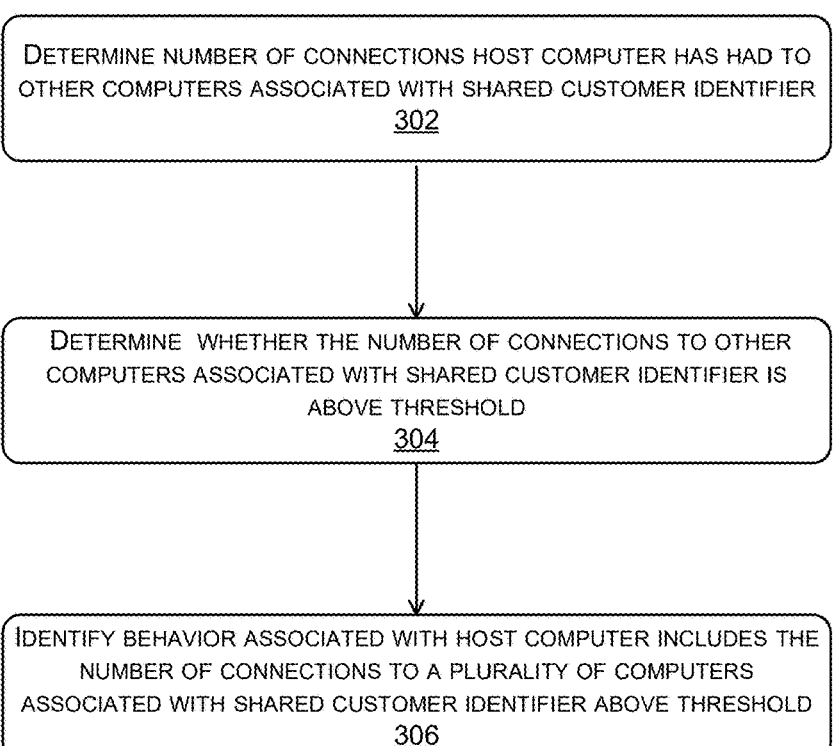

DETERMINE NUMBER OF CONNECTIONS HOST COMPUTER HAS HAD TO OTHER COMPUTERS ASSOCIATED WITH SHARED CUSTOMER IDENTIFIER
302

DETERMINE WHETHER THE NUMBER OF CONNECTIONS TO OTHER COMPUTERS ASSOCIATED WITH SHARED CUSTOMER IDENTIFIER IS ABOVE THRESHOLD
304

IDENTIFY BEHAVIOR ASSOCIATED WITH HOST COMPUTER INCLUDES THE NUMBER OF CONNECTIONS TO A PLURALITY OF COMPUTERS ASSOCIATED WITH SHARED CUSTOMER IDENTIFIER ABOVE THRESHOLD
306

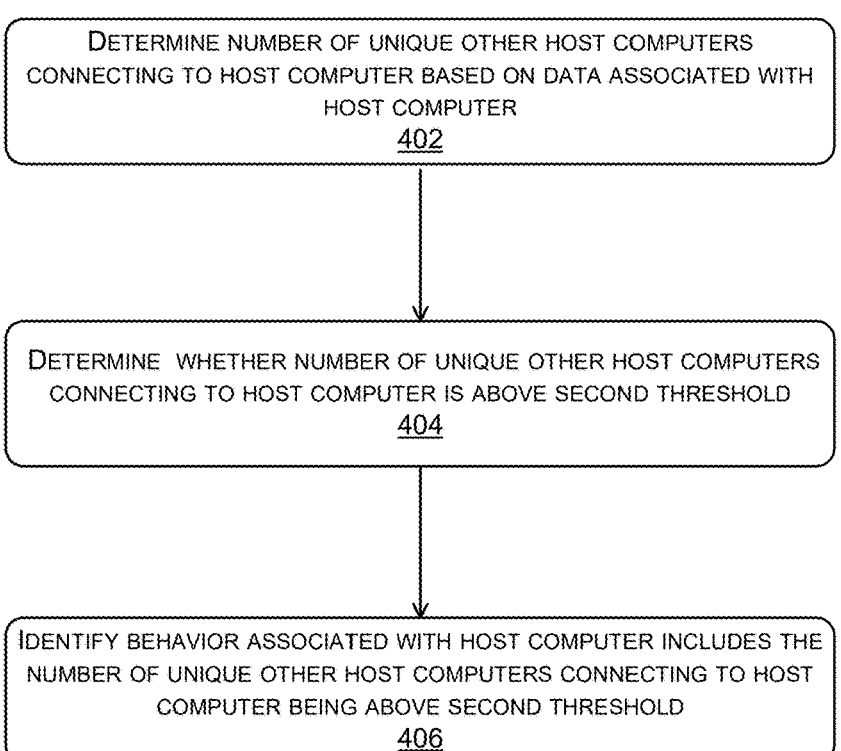

DETERMINE NUMBER OF UNIQUE OTHER HOST COMPUTERS CONNECTING TO HOST COMPUTER BASED ON DATA ASSOCIATED WITH HOST COMPUTER
402

DETERMINE WHETHER NUMBER OF UNIQUE OTHER HOST COMPUTERS CONNECTING TO HOST COMPUTER IS ABOVE SECOND THRESHOLD
404

IDENTIFY BEHAVIOR ASSOCIATED WITH HOST COMPUTER INCLUDES THE NUMBER OF UNIQUE OTHER HOST COMPUTERS CONNECTING TO HOST COMPUTER BEING ABOVE SECOND THRESHOLD
406

FIG. 4

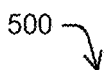

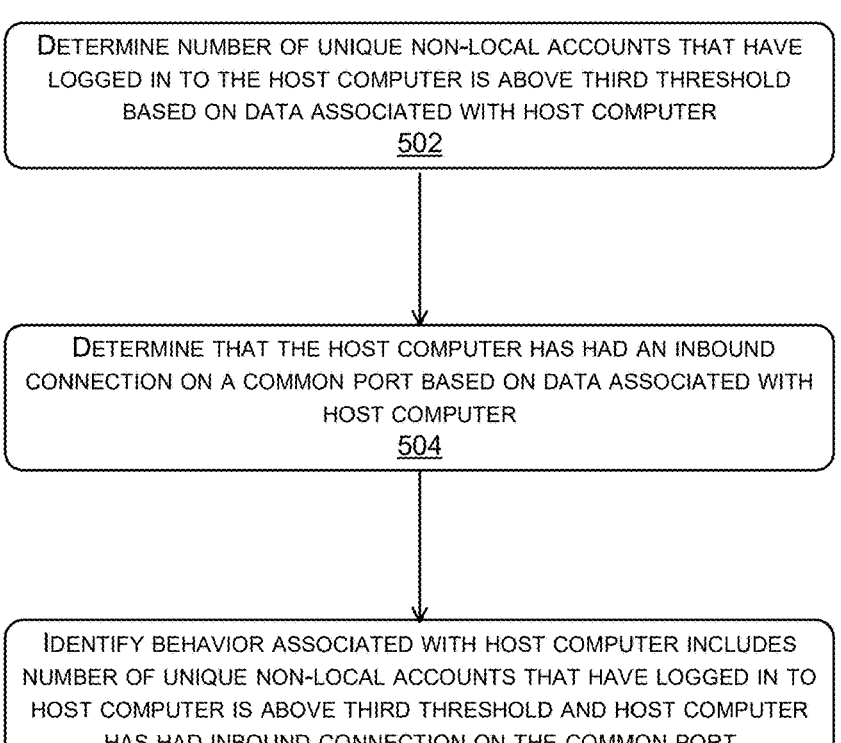

DETERMINE NUMBER OF UNIQUE NON-LOCAL ACCOUNTS THAT HAVE LOGGED IN TO THE HOST COMPUTER IS ABOVE THIRD THRESHOLD BASED ON DATA ASSOCIATED WITH HOST COMPUTER
502

DETERMINE THAT THE HOST COMPUTER HAS HAD AN INBOUND CONNECTION ON A COMMON PORT BASED ON DATA ASSOCIATED WITH HOST COMPUTER
504

IDENTIFY BEHAVIOR ASSOCIATED WITH HOST COMPUTER INCLUDES NUMBER OF UNIQUE NON-LOCAL ACCOUNTS THAT HAVE LOGGED IN TO HOST COMPUTER IS ABOVE THIRD THRESHOLD AND HOST COMPUTER HAS HAD INBOUND CONNECTION ON THE COMMON PORT
506

FIG. 5

BEHAVIOR-BASED ASSET CLASSIFICATIONS

BACKGROUND

Security analysts face an increasing number of alerts about software vulnerabilities and network vulnerabilities. Vulnerability management software has been helpful in more efficiently surfacing vulnerabilities. However, it also contributes to a problematic rise in alert fatigue for these security analysts from the increasingly overwhelming number of alerts.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 2 illustrates a flow diagram of an example method of dynamic behavior-based asset classification, as described herein.

FIG. 3 illustrates a flow diagram of an example method of dynamic behavior-based asset classification, as described herein.

FIG. 4 illustrates a flow diagram of an example method of dynamic behavior-based asset classification, as described herein.

FIG. 5 illustrates a flow diagram of an example method of dynamic behavior-based asset classification, as described herein.

DETAILED DESCRIPTION

Overview

Figure 1:
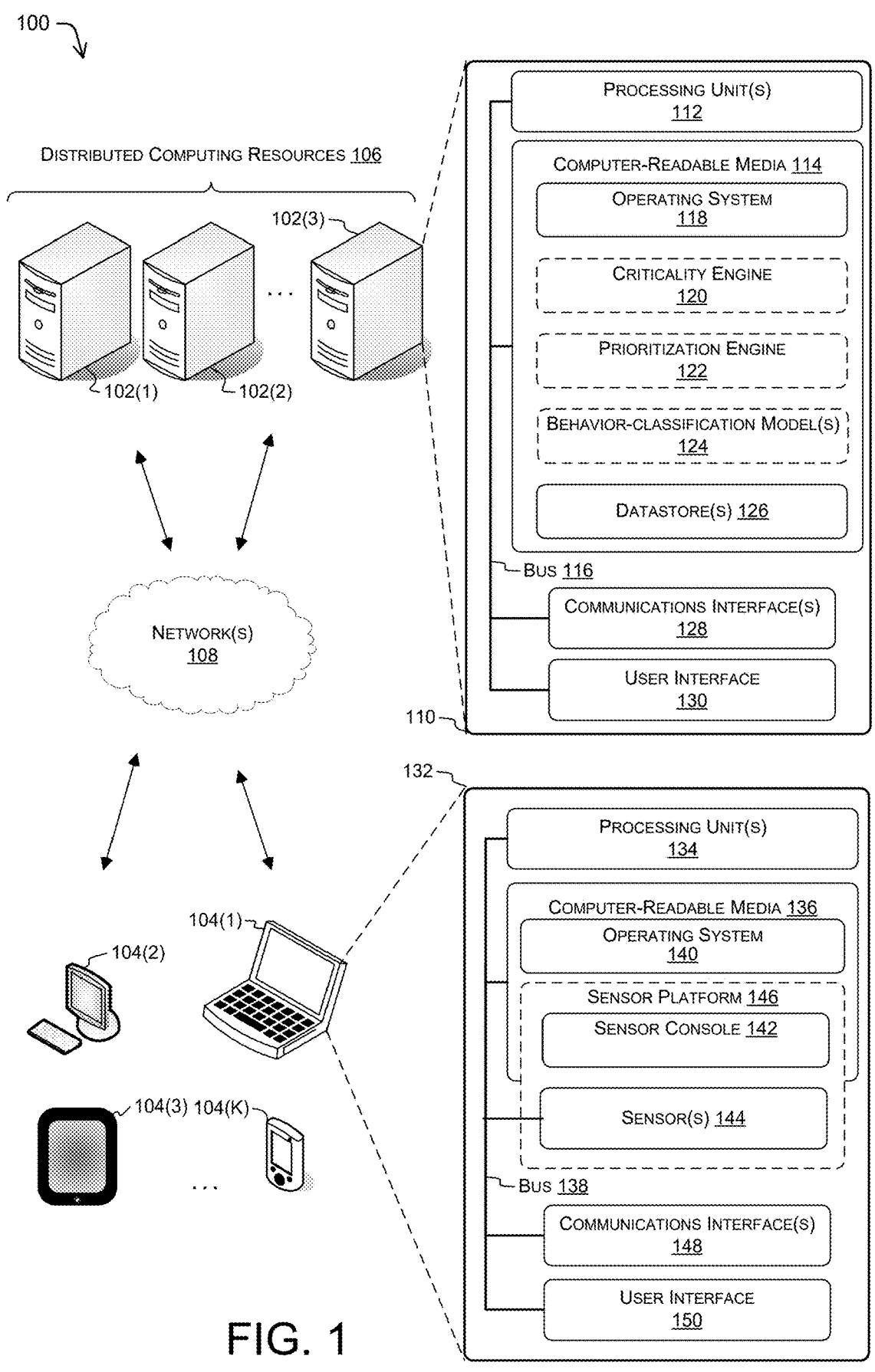
FIG. 1 illustrates a system-architecture diagram of an environment in which dynamic behavior-based asset classification can be deployed to efficiently identify critical assets and prioritize alerts for the most consequential vulnerabilities.

With a limited number of analysts who can each analyze a limited number of alerts, there remains a need to identify critical assets and prioritize alerts for the most consequential vulnerabilities without requiring manual assignments designating asset criticality and without simply relying on conventional-static server designations and rules.

This disclosure describes dynamic behavior-based asset classification techniques, systems, and one or more computer-readable media including instructions for identifying critical assets and prioritizing alerts for the most consequential vulnerabilities to help mitigate alert fatigue for security analysts and enable them to patch vulnerabilities that will have the greatest impact. The dynamic behavior-based asset classification techniques, systems, and one or more computer-readable media can include one or more components configured to identify critical assets and prioritize which alerts are provided according to the most consequential vulnerabilities based on behaviors at and/or traffic to a particular host computer. In various examples, the system described herein can identify critical assets based on classifying host computers as highly active servers, highly connected servers, and/or as servers based on remote logins and inbound port connections without regard to server specification or server configuration designations. The system described herein can automatically assign a label to an asset corresponding to the server classification and/or behavior classification. In some examples, the system can identify assets as subtypes of servers including dynamic host configuration protocol (DHCP) servers, domain name system (DNS) servers, file transfer protocol (FTP) servers, secure shell host (SSH) servers, web servers, etc. In various examples, the techniques, system, and computer-executable instructions can generate a report of the vulnerabilities deemed most consequential and/or patched for analysts and/or clients of the system. In some examples, the system, via an interface, can receive instructions from analysts and/or clients, for example, to further refine types of vulnerabilities identified, and/or to change and/or set parameters for various thresholds and/or periods of time.

The techniques described herein can improve functioning of a computing device by providing an efficient method for identifying critical assets and providing alerts prioritized according to consequences associated with particular vulnerabilities of the critical assets. Surfacing more important alerts based on behavior at and/or traffic to particular of the host computers can reduce network traffic associated with alerts that may be unactionable based on excess amounts of traffic for which humans cannot adequately respond and thereby also mitigate alert fatigue for security analysts. Surfacing more important alerts based on behavior at and/or traffic to particular of the host computers can also surface alerts related to vulnerabilities that may not otherwise be apparent, which can help focus security analysts on effective actions to address consequential vulnerabilities that might otherwise not have had an associated alert.

In at least one example, an asset classification system can be associated with one or more host computers, which can include one or more sensor(s) and/or associated sensor console(s). The asset classification system can include one or more computer-readable media having computer-executable instructions to implement dynamic behavior-based asset classification techniques. Example techniques can include an asset classification system receiving data associated with a host computer, determining, based on the data, at least one behavior associated with the host computer, assigning the host computer a server classification based on the determination that the at least one behavior associated with the host computer represents a behavior of focus being above a threshold, and recording the assigned server classifications associated with the host computer.

In various examples, an asset classification system can receive at least part of the data from the one or more sensor(s) and/or associated sensor console(s), which can be implemented as part of one or more sensor platform(s) at the host computer(s). In at least one example, these can include one or more FALCON sensor(s) and/or FALCON console(s) as part of a FALCON sensor platform from CROWD-STRIKE Holdings, Inc. In some examples, these can include one or more other sensor(s) and/or sensor console(s) as part of a sensor platform from CROWDSTRIKE Holdings, Inc. and/or other source(s). The one or more sensor(s), associated sensor console(s), and/or associated sensor platform(s) can be configured to collect data related to assets associated with the particular host computer, to collect data related to organization of assets associated with the host computer, to collect data related to the specification/configuration of the host computer, and/or to collect data related to behaviors associated with the host computer.

In some examples, an asset classification system can determine at least one behavior associated with the one or more host computer(s) according to a variety of schedules or criteria, e.g., daily, multiple times per day, periodically, as configured for host computer(s) associated with particular client(s) of the asset classification system, as configured for individual host computer(s), at a cadence based on the volume of data from the sensor(s), associated sensor console(s), and/or associated sensor platform(s) associated with the host computer(s), etc.

In various examples, the system described herein can identify critical assets based on classifying host computers as highly active servers, highly connected servers, and/or as servers based on remote logins and inbound port connections without regard to server specification or server configuration designations and assign a label to the assets corresponding to the classification. In some examples, the system can identify assets as subtypes of servers including dynamic host configuration protocol (DHCP) servers, domain name system (DNS) servers, file transfer protocol (FTP) servers, secure shell host (SSH) servers, web servers, etc.

In some examples, an asset classification system can be configured to determine that the host computer has had a number of connections to other computers associated with a shared customer identifier, determine whether the number of connections to other computers associated with the shared customer identifier is above the threshold, and the at least one behavior associated with the host computer can include the number of connections to a plurality of computers associated with the shared customer identifier being above the threshold. In various examples, the number of connections can include an average number of connections during a first period of time. In some examples, the number of connections can be considered according to a second period of time, which can be predetermined and/or customized such as a 45-day sliding window of time, a specific 45-day window of time, a 7-day sliding window of time, a specific 7-day window of time, daily, multiple times per day, periodically, cadence based on volume of data from a sensor, sensor console, or sensor platform associated with the host computer.

In some examples, an asset classification system can be configured to determine, based on the data associated with the host computer, a number of unique other host computers connecting to the host computer, determine whether the number of unique other host computers connecting to the host computer is above a threshold number, and the at least one behavior associated with the host computer can include the number of unique other host computers connecting to the host computer being above the threshold number.

In some examples, an asset classification system can be configured to determine, based on the data associated with the host computer, a number of unique non-local accounts, e.g., non-local user accounts, non-local computer accounts, etc., that have logged in to the host computer is above a threshold number, determine, based on the data associated with the host computer, that the host computer has had an inbound connection on a common port, and that the at least one behavior associated with the host computer includes the number of unique non-local accounts, e.g., non-local user accounts, non-local computer accounts, etc., that have logged in to the host computer is above a threshold number and that the host computer has had the inbound connection on the common port.

The techniques described herein may be implemented in a number of ways. Examples are provided below with reference to the following figures. Although discussed in the context of an asset classification system, the methods, apparatuses, techniques, and systems, described herein can be applied to a variety of systems, and are not limited to an asset classification systems per se.

Illustrative Environment

FIG. 1 illustrates a system-architecture diagram of an environment 100 in which dynamic behavior-based asset classification can be deployed to efficiently identify critical assets and prioritize alerts for the most consequential vulnerabilities. The environment 100 can include various devices and/or components. The illustrated environment includes computing device(s) 102(1)-102(N) (individually and/or collectively referred to herein with reference 102), where N is any integer greater than and/or equal to 1, e.g., server(s) and/or desktop computer(s). The illustrated environment includes computing devices 104(1)-104(K) (individually and/or collectively referred to herein with reference 104), where K is any integer greater than and/or equal to 1. In some examples, N=K; in other examples, N>K or N<K e.g., laptop computer(s), tablet computer(s), hybrid computing device(s), and/or smart phones. Computing device(s) 102 and/or 104 can include a diverse variety of device categories, classes, and/or types and are not limited to any of the particular types of devices illustrated.

In the illustrated example, computing device(s) 102(1)-102(N) can be computing nodes of distributed computing resources 106 configured for operation as an asset classification system, e.g., in a computing cluster, such as a cloud service such as MICROSOFT AZURE, VMWARE VCLOUD, RACKSPACE, Inc.'s OPENSTACK, AMAZON WEB SERVICES (AWS), IBM SMARTCLOUD, ORACLE CLOUD, etc. In the illustrated example, computing device(s) 104 can include consumer devices and in some instances can operate as host computers for clients of distributed computing resources 106 that can submit data to distributed computing resources 106 and/or receive updates and/or reports from distributed computing resources 106. Computing devices 102(1)-102(N) in distributed computing resources 106 can, share resources, balance load, increase performance, and/or provide fail-over support and/or redundancy, etc. Computing devices 104 can additionally or alternatively operate in a cluster and/or grouped configuration via association with one or more clients of an asset classification system.

By way of example and not limitation, computing device(s) 102 can include, but are not limited to, server computers and/or blade servers such as Web servers, map/reduce servers and/or other computation engines, and/or network-attached-storage units (e.g., 102(1)). By way of example and not limitation, computing device(s) 104 can include, but are not limited to, laptop computers (e.g., 104(1)), desktop computers (e.g., 104(2)), tablet computers 104(3), smartphones (e.g., 104(4)), and/or other telecommunication devices, hybrid computers, and/or integrated components for inclusion in computing devices, appliances, and/or other computing device(s) configured to provide data to an asset classification system.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, 5G, and so forth), any combination thereof, etc. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, FIBRE CHANNEL switches and/or hubs, etc.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and/or one or more other standards, e.g., BLUETOOTH, cellular-telephony standards such as code division multiple access (CDMA), global system for mobile communication (GSM), 3rd Generation Partnership Project (3GPP) standards, such as long-term evolution (LTE) and/or new radio (NR), voice over internet protocols (VOIP), worldwide interoperability for microwave access (WiMAX), etc.

Different networks have different characteristics, e.g., bandwidth, latency, accessibility (open, announced but secured, and/or not announced), and/or coverage area. The type of network 108 used for any given connection between, e.g., a computing device 104 and distributed computing resources 106 can be selected based on these characteristics and on the type of interaction.

Still referring to the example of FIG. 1, details of an example computing device 102(3) are illustrated at inset 110. The details of example computing device 102(3) can be representative of others of computing device(s) 102. However, each of the computing device(s) 102 can include additional or alternative hardware and/or software components.

Illustrated computing device 102 can include one or more processing unit(s) 112, e.g., integrated electronic circuit(s) operably connected to one or more computer-readable media 114, e.g., memories, such as via a bus 116. In some examples, a plurality of processing unit(s) 112 can exchange data through an internal interface bus (e.g., PCIe), rather than and/or in addition to network 108. While the processing unit(s) 112 are described as residing on the computing device 102(3), in this example, the processing unit(s) 112 can also reside on different computing device(s) 102 and/or

104 in some examples. In some examples, at least two of the processing unit(s) 112 can reside on different computing device(s) 102 and/or 104. In such examples, multiple processing unit(s) 112 on the same computing device 102 and/or 104 can use a bus 116 of the computing device 102 and/or 104 to exchange data, while processing unit(s) 112 on different computing device(s) 102 and/or 104 can exchange data via network(s) 108.

Processing unit(s) 112 can include one or more microprocessors, single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing unit(s) 112 include Field-Programmable Gate Arrays (FPGAs), Application-Specific Integrated Circuits (ASICs), Application-Specific Standard Products (ASSPs), System-on-a-Ship systems (SOCs), Complex Programmable Logic Devices (CPLDs), Digital Signal Processors (DSPs), and other types of customizable processors. For example, a processing unit 112 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104 can include a plurality of processing unit(s) 112 of multiple types. For example, the processing unit(s) 112 shown in computing device 102(3) can be a combination of one or more CPUs, GPGPUs, FPGAs, etc. Different processing unit(s) 112 can have different execution models, e.g., as is the case for graphics processing units (GPUs) and central processing unit (CPUs).

Computer-readable media described herein, e.g., computer-readable media 114, includes, for example, communication media or digital storage media such as non-transitory computer-readable media. Digital storage media includes tangible storage units such as volatile memory, nonvolatile memory, and/or other persistent and/or auxiliary computer storage media, removable and non-removable digital storage media implemented in any method and/or technology for storage of information such as computer-readable instructions, data structures, program modules, and/or other data. Digital storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In some examples, computer-readable media 114 can store instructions executable by the processing unit(s) 112 that, as discussed above, can represent a processing unit incorporated in computing device 102. Computer-readable media 114 can additionally and/or alternatively store instructions executable by external processing units such as by an external central processing unit (CPU) and/or external processor of any type discussed herein. In some examples at least one processing unit 112, e.g., a CPU, graphics processing unit (GPU), and/or hardware logic device, can be incorporated in computing device 102, while in some examples at least one processing unit 112, e.g., one or more of a CPU, GPU, and/or hardware logic device, can be external to computing device 102.

Computer-readable media 114 can store, for example, computer-executable instructions of an operating system 118, module(s) of a criticality engine 120, a prioritization engine 122, and/or other modules, programs, and/or applications that are loadable and executable by processing unit(s) 112. In various examples, computer-readable media 114 can store, uncompiled or otherwise non-executable computer-executable instructions of a criticality engine 120, a prioritization engine 122, etc. In some examples not shown, one or more of the processing unit(s) 112 in one of the computing device(s) 102 and/or 104 can be operably connected to computer-readable media 114 in a different one of the computing device(s) 102 and/or 104, e.g., via communications interface and network 108. For example, program code to perform operations of flow diagrams herein, e.g., as described herein with reference to criticality engine 120, prioritization engine 122, etc. can be downloaded from a computing device 102 operating as a server to a computing device 104 operating as a client, e.g., via the network 108, and executed by one or more processing unit(s) in computing device 104. For example, the computer-executable instructions stored on the computer-readable media 114 can upon execution configure a computer such as a computing device 102 and/or 104 to perform operations described herein with reference to the operating system 118, the criticality engine 120 and/or prioritization engine 122.

Computer-readable media 114 can also store, for example, one or more behavior-classification model(s) 124 or other a machine learning model(s), individually and/or collectively referred to herein with reference 124. When included, behavior-classification model(s) 124 can include dynamic behavior-based thresholds for asset classification and can accommodate a variety of criteria associated with host computer(s) 104, e.g., related to assets associated with host computer(s) 104, the organization of assets associated with the host computer(s), the specification/configuration of the host computer(s), and behaviors of focus associated with the host computer(s), which can include frequency of other host computer(s) connecting to a particular host computer, a threshold number of unique other host computer(s) connecting to the particular host computer, a number of instances of remote logins related to certain inbound port connections, etc., and can be associated with one or more datastore(s) 126. In various examples, datastore(s) 126 can include an asset graph database and/or one or more other types of databases, and/or a network traffic log, such as an inbox network traffic log associated with a particular host computer. In some examples, datastore(s) 126 can include data represented in a table schema that is configured to facilitate discovery via a data pipeline. The various dynamic behavior-based thresholds can also be customized, e.g., based on a period of time that can be predetermined and/or customized such as a 45-day sliding window of time, a specific 45-day window of time, a 7-day sliding window of time, a specific 7-day window of time, daily, multiple times per day, periodically, cadence based on volume of data from a sensor, sensor console, or sensor platform associated with the host computer 104. Further examples of dynamic behavior-based thresholds that can be predetermined and/or customized include numbers of other host computer(s) connecting to a particular host computer, numbers of unique other host computer(s) connecting to the particular host computer, a number of instances of remote logins related to certain inbound port connections, etc. In some examples without behavior-classification model(s) 124, dynamic behavior-based thresholds can be stored in datastore 126. In at least one example, criticality engine 120 and/or prioritization engine 122 can perform data analysis and/or processing. In examples including criticality engine 120 and/or prioritization engine 122 and behavior-classification model(s) 124, criticality engine 120 and/or prioritization engine 122 can determine values of thresholds compared to behavior-classification model(s) 124 to perform data analysis and/or processing.

Bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof can operably connect one or more processing unit(s) 112 to one or more computer-readable media 114.

Computing device 102 can also include one or more communications interfaces 128 connected via the bus 116 to processing unit(s) 112 to enable wired and/or wireless communications between computing device(s) 102 and other networked computing devices 102 and/or 104 involved in dynamic behavior-based asset classification, and/or other computing device(s), e.g., over network(s) 108. Such communications interface(s) 128 can include one or more transceiver devices, e.g., network interface controllers (NICs) such as Ethernet NICs and/or other types of transceiver devices, to send and receive communications over a network. The processing unit(s) 112 can exchange data through respective communications interface(s) 128. In some examples, the communications interface 128 can include a PCI Express (PCIe) transceiver, and the network 108 can include a PCIe bus. In some examples, the communications interface 128 can include, but is not limited to, a transceiver for cellular (3G, 4G, 5G, and/or other), WI-FI, Ultrawideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other components are omitted from the illustrated computing device 102(3).

As noted above, computer-readable media 114 of the computing device 102 can store an operating system 118. In some examples, an operating system 118 is not used (commonly referred to as a "bare metal" configuration). In some examples, the operating system 118 can include components that enable and/or direct the computing device 102 to detect and receive data via various inputs (e.g., user controls, network and/or communications interfaces, memory devices, and/or sensors), and process the data using the processing unit(s) 112 to generate output. The operating system 118 can further include one or more components that present the output (e.g., display an image on an electronic display, store data in memory, and/or transmit data to another computing device). The operating system 118 can enable a developer or an engineer to interact with the computing device 102 using a user interface. User interface(s) (UI) s described herein can include one or more of a graphical user interface (GUI), and audio user interface (AUI), and/or various other input/output interfaces generally referenced as UI including touch-input interfaces and the like. Additionally, the operating system 118 can include components that perform various functions generally associated with an operating system 118, e.g., storage management and internal-device management.

In some examples, computing device 102 can include a user interface 130 configured to permit a developer or an engineer responsible for computing device 102(3), distributed computing resources 106, environment 100 and/or an application administrator, to operate and/or to access the datastore(s) 126. In examples, computing device 102 can include a user interface 130 configured to permit a developer or an engineer responsible for computing device 102(3), distributed computing resources 106, environment 100 and/or an application administrator, to operate the criticality engine 120, the prioritization engine 122, and/or the behavior-classification model(s) 124, and/or to access the datastore(s) 126.

Aspects of the processing operations may be parallelized and input to a parallel processor unit (such as a GPU) for efficient processing. Accordingly, implementing the techniques described herein can efficiently make use of available computational resources (e.g., memory and/or processor allocation or usage) while also improving accuracy of predictions. In some examples, the computing device(s) 102 can allocate input data to a parallel processor unit (e.g., a CPU, GPU, or the like capable of processing input data at substantially a same time). For example, the criticality engine 120, the prioritization engine 122, the behavior-classification model 124 (when included), and the like can be processed in parallel by the processing unit(s) 112.

In some instances, a training component (not shown) may be executed by one or more processor(s) of a computing device to train a machine learning model, e.g., behavior-classification model 124, based on training data. The training data may include a wide variety of data, such as computer behavior data, historical data, visualizations of a security threat, or a combination thereof, that is associated with a value (e.g., a classification of interest, inference, prediction, etc.). Such values may generally be referred to as a "ground truth." To illustrate, the training data may be used for determining presence of a potential security impact to operation of a computing device in a data stream and that is associated with one or more classifications or determinations. In some examples, such a classification may be based on user input (e.g., user input indicating that the data depicts a specific risk) or may be based on the output of another machine learned model e.g., behavior-classification model 124. In some examples, such labeled classifications (or more generally, the labeled output associated with training data) may be referred to as ground truth.

In various examples, criticality engine 120 can detect data from one or more sensor(s), sensor console(s), and/or sensor platform(s) associated with individual host devices 104. Detecting data representing behavior associated with an individual host device 104 can include receiving data from the one or more sensor(s), sensor console(s), and/or sensor platform(s) associated with individual host devices 104. In some examples, criticality engine 120 can pull such data and/or the data associated with the host device 104 can be pushed to a dynamic behavior-based asset classification system by the one or more sensor(s), sensor console(s), and/or sensor platform(s).

Though depicted in FIG. 1 as separate components of the computing device(s) 102 at inset 110, functionality associated with the criticality engine 120, the prioritization engine 122, the behavior-classification model(s) 124, and/or information from the datastore(s) 126 can be included in a different component of the dynamic behavior-based asset classification system or be included in the device(s) 102. In some instances, the components described herein may comprise a pluggable component, such as a virtual machine, a container, a serverless function, etc., that is capable of being implemented in a service provider and/or in conjunction with any Application Program Interface (API) gateway.

The host device 104 may also be referred to as a "host computing device," "host device," "computing device 104," and/or "monitored computing device." An entity may be associated with the host device(s) 104, and the entity (e.g., user, computing device, organization, or the like) may have registered for security services provided by a service provider of the computing device(s) 102 and/or distributed computing resources 106.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 112. Some examples of computer-readable media 136 are discussed above with reference to computer-readable media 114. For example, computer-readable media 136 can include one or more digital storage media or communications media. Some examples of bus 138 are discussed above with reference to bus 116.

Computer-readable media 136 can store, for example, computer-executable instructions of an operating system 140, sensor console 142, and/or other modules, programs, and/or applications that are loadable and executable by processing unit(s) 134. Some examples of operating system 140 are discussed above with reference to inset 110.

In some examples, the computing device 104 can be configured with one or more sensor(s) 144, e.g., FALCON sensor(s) or CROWDSTRIKE sensor(s), etc., that can operate independently or with sensor console 142 and/or as part of an optional sensor platform 146. The one or more sensor(s) 144, associated sensor console(s) 142, and/or associated sensor platform(s) 146, can be configured to collect data related to assets associated with the particular host computer 104, to collect data related to organization of assets associated with the host computer, to collect data related to the specification/configuration of the host computer, and/or to collect data related to behaviors associated with the host computer. For example, when a host computer is not configured as a server, and is instead a computer or asset otherwise configured, such as configured as a workstation, e.g., an employee's in-office computer, an employee's laptop computer, a vendor's machine on a private network, another type of computing asset, etc., the sensor(s) 144, sensor console 142, and/or sensor platform 146, can receive signals from the respective machine 104, from which the dynamic behavior-based asset classification system can determine that the machine is behaving like a server, e.g., a webserver, a DHCP server, etc., even though the specification data may not state that the host machine 104 is a server.

In various examples, the computing device 104 can be configured to communicate with distributed computing resources 106 and/or computing device(s) 102 to send data to datastore 126, for inclusion in behavior-classification model(s) 124 and/or for operation by criticality engine 120 and/or prioritization engine 122. For example, the computing device 104 can transmit a data related to assets associated with host computer(s) 104 to distributed computing resources 106 and/or computing device(s) 102 that can result in output from the criticality engine 120 and/or prioritization engine 122, and can provide a recommendation to address one or more of the most consequential vulnerabilities via a user interface 148 based on that output. In some examples, functions described herein can be shared between one or more computing device(s) 102 and one or more computing device(s) 104.

Computing device 104 can also include one or more communications interfaces 148 connected via the bus 138 to processing unit(s) 134 to enable wired and/or wireless communications between computing device(s) 104 distributed computing resources 106 and/or and other networked computing devices 102 and/or 104 associated with a shared customer of the distributed computing resources 106, and/or other computing device(s), over network(s) 108. Some examples are discussed above with reference to communications interface(s) 128.

Computing device 104 can include a user interface 150. For example, computing device 104(4) can provide user interface 150 to control and/or otherwise interact with sensor console 142 and/or sensor(s) 144, whether as part of sensor platform 146, or separately. In some examples, user interface 150 can control and/or otherwise interact with distributed computing resources 106, and/or computing devices 102. For example, processing unit(s) 134 can receive inputs e.g., typed and/or spoken queries and/or user utterances and/or other input actions associated with dynamic behavior-based asset classification via user interface 150 and transmit corresponding data via communications interface(s) 148 to computing device(s) 102.

User interfaces 130 and/or 150 can include one or more input devices, integral and/or peripheral to computing device 102 and/or 104. The input devices can be user-operable, and/or can be configured for input from other computing device(s) 102 and/or 104. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, a QR code or bar code scanner, and the like. User interfaces 130 and/or 150 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like.

Illustrative Processes

The order in which the operations are described in each example flow diagram and/or process is not intended to be construed as a limitation, and any number of the described operations can be combined in any order and/or in parallel to implement each process. Moreover, the operations in each of FIGS. 2-5 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions. Example operations shown in FIGS. 2-5 are also not limited to being carried out by any specifically-identified modules or components and can be carried out by any specifically configured modules or components.

FIG. 2 is a flow diagram illustrating an example process 200 of dynamic behavior-based asset classification, as described herein. The example process 200 can be implemented by a computing device such as the computing device(s) 102 of FIG. 1 e.g., using software such as criticality engine 120, prioritization engine 122, and/or behavior-classification model(s) 124 running on such device(s). For the sake of illustration, the example process 200 represents configuring a device to operate as a dynamic behavior-based asset classification system, or as a component of such a system. The computing device(s) 102 can implement the modules corresponding to criticality engine 120, prioritization engine 122, and/or behavior-classification model(s) 124 as well as datastore(s) 126 to generate a record of particular assigned dynamic behavior-based server classification(s) and/or reporting of these classifications for analysts accessing distributed computing resources 106 and/or sending to a computing device (e.g., the host device(s) 104) for the client(s) to implement security protocols according to a dynamic data stream (e.g., a data stream that changes over time).

An operation 202 can include a dynamic behavior-based asset classification system, implemented via distributed computing resources 106, which can include one or more processing unit(s) 112 in one or more computer(s) 102, configured to receive or receiving data associated with one or more host computer(s) 104 via communications interface(s) 128.

An operation 204 can include the dynamic behavior-based asset classification system including at least one criticality engine 120, implemented via distributed computing resources 106, which can include one or more processing units 112 in one or more computer(s) 102, being configured to determine or determining behavior associated with and/or traffic to one or more host computer(s) 104 based on the data associated with the host computer(s) 104.

An operation 206 can include the dynamic behavior-based asset classification system including at least one prioritization engine 122, implemented via distributed computing resources 106, which can include one or more processing units 112 in one or more computer(s) 102, being configured to assign or assigning a server classification based on the determination that the behavior associated with the host computer represents a behavior of focus.

An operation 208 can include the dynamic behavior-based asset classification system, implemented via distributed computing resources 106, which can include one or more processing units 112 in one or more computer(s) 102, being configured to record the assigned server classification associated with the host computer(s) 104 in datastore(s) 126. In some examples, operation 208 can include reporting the assigned server classification for analysts accessing distributed computing resources 106 via user interface 130 and/or sending to a computing device (e.g., the host device(s) 104)

for the client(s) to implement security protocols according to a dynamic data stream (e.g., a data stream that changes over time) via communications interface(s) 128.

FIG. 3 illustrates a flow diagram of an example process 300 of dynamic behavior-based asset classification, as described herein. The example process 300 can be implemented by one or more computing device(s) such as the computing device(s) 102 of FIG. 1, e.g., using software such as modules corresponding to criticality engine 120, prioritization engine 122, and/or behavior-classification model(s) 124 as well as datastore(s) 126 running on such device(s). For the sake of illustration, the example process 300 represents configuring a device 102 to operate as a dynamic behavior-based asset classification system to identify server(s) of a highly-active server type, or as a component of such a system.

An operation 302 can include the dynamic behavior-based asset classification system, implemented via distributed computing resources 106, which can include one or more processing units 112 in one or more computer(s) 102 including criticality engine 120, being configured to determine or determining, based on data associated with a particular host computer 104, that the particular host computer 104 has had a number of connections to other computers, e.g., computers associated with a shared customer identifier and/or network connections. In various examples, the number of connections can include an average number of connections during a first period of time. In some examples, the number of connections can be considered according to a second period of time, which can be predetermined and/or customized such as a 45-day sliding window of time, a specific 45-day window of time, a 7-day sliding window of time, a specific 7-day window of time, daily, multiple times per day, periodically, cadence based on volume of data from a sensor, sensor console, or sensor platform associated with the host computer.

An operation 304 can include the dynamic behavior-based asset classification system, implemented via distributed computing resources 106, which can include one or more processing units 112 in one or more computer(s) 102, being configured via criticality engine 120 to determine or determining whether the number of connections from other computers, e.g., associated with the shared customer identifier, is above the threshold. For example, a host computer 104 not configured as a server, and is instead otherwise configured, such as configured as a workstation, e.g., an employee's in-office computer, an employee's laptop computer, a vendor's machine on a private network, another type of computing asset, etc., generally would be expected to have few connections from other computers in a client's company. Thus, if data from the respective machine 104, shows numerous connections, e.g., a number of connections above the threshold, the dynamic behavior-based asset classification system can determine that the machine is behaving like a server, e.g., a webserver, a DHCP server, etc., even though the specification data may not state that the host machine 104 is a server. In at least one example, the criticality engine 120 can determine that the host computer 104 is highly active based on the number of connections to the host computer 104 relative to the frequency of connections to other computers across the client company's organization. In various examples, the number of connections can include an average number of connections during a first period of time. In some examples, the number of connections can be considered according to a second period of time, which can be predetermined and/or customized such as a 45-day sliding window of time, a specific 45-day window of time, a 7-day sliding window of time, a specific 7-day window of time, daily, multiple times per day, periodically, cadence based on volume of data from a sensor, sensor console, or sensor platform associated with the host computer.

An operation 306 can include the dynamic behavior-based asset classification system, implemented via distributed computing resources 106, which can include one or more processing units 112 in one or more computer(s) 102, being configured via prioritization engine 122 to identify or identifying that behavior associated with the host computer(s) 104 includes the number of connections to a plurality of computers associated with the shared customer identifier is above the threshold. In at least one example, the prioritization engine 122 can prioritize patching vulnerabilities on host computer 104 based on a calculation of frequency of connections per asset relative to other host computers within the client company's organization. Thus, the prioritization engine 122 of the dynamic behavior-based asset classification system can be configured to prioritize the host computers 104 with the highest percentile of connections for the client company's organization, though other host computers 104 associated with other client companies' organizations may have more connections and not be in the highest percentile for their organization. In various examples, the threshold for the highest percentile to prioritize host computer(s) as highly active servers can be predetermined as any percentage within the top 10%, top 5%, top 1%, etc. of the host computers 104 of the client company's organization with the most connections over a threshold period of time. In some examples, the threshold percentage can be customizable by the client company's organization. In various examples, the threshold period of time can be predetermined as a number of hours, days, weeks, months, etc. For example, the period of time can be predetermined such as 4 hours, 12 hours, 24 hours, 2 days, 7 days, 2 weeks, 4 weeks, one month, 45 days, 60 days, etc., though these are merely examples, and the dynamic behavior-based asset classification system can accommodate other periods of time. In some examples, the threshold period of time can be customizable by the client company's organization.

FIG. 4 illustrates a flow diagram of an example process 400 of dynamic behavior-based asset classification, as described herein. The example process 400 can be implemented by one or more computing device(s) such as the computing device(s) 102 of FIG. 1, e.g., using software such as modules corresponding to criticality engine 120, prioritization engine 122, and/or behavior-classification model(s) 124 as well as datastore(s) 126 running on such device(s). For the sake of illustration, the example process 400 represents configuring a device to operate as a dynamic behavior-based asset classification system to identify server(s) of a highly-connected server type, or as a component of such a system.

An operation 402 can include the dynamic behavior-based asset classification system, implemented via distributed computing resources 106, which can include one or more processing units 112 in one or more computer(s) 102 including criticality engine 120, being configured to determine or determining, based on data associated with a particular host computer 104, a number of unique other host computers connecting to the host computer.

An operation 404 can include the dynamic behavior-based asset classification system, implemented via distributed computing resources 106, which can include one or more processing units 112 in one or more computer(s) 102, being configured to determine or determining via criticality engine

120 whether the number of unique other host computers connecting to the particular host computer(s) 104 is above a second threshold. For example, a host computer 104 configured as a server, generally would be expected to have few unique other host computer(s) 104 connect to it. Thus, if data from the respective machine 104, shows numerous connections from unique other machines, e.g., a number of unique machines above the threshold, the dynamic behavior-based asset classification system can determine that the machine is behaving like a server, e.g., a webserver, a DHCP server, etc., even though the specification data may state that the host machine 104 is not a server. In at least one example, the criticality engine 120 can determine that the host computer 104 is highly connected based on the number of unique other machines connecting to the host computer 104 relative to the frequency of connections to other computers across the client company's organization.

An operation 406 can include the dynamic behavior-based asset classification system, implemented via distributed computing resources 106, which can include one or more processing units 112 in one or more computer(s) 102, being configured via prioritization engine 122 to identify or identifying that behavior associated with the host computer(s) 104 includes the number of unique other host computers connecting to the host computer(s) 104 is above the second threshold. In at least one example, the prioritization engine 122 can prioritize patching vulnerabilities on host computer 104 based on a calculation of the number of unique other computers connecting per asset relative to other host computers within the client company's organization. Thus, the prioritization engine 122 of the dynamic behavior-based asset classification system can be configured to prioritize the host computers 104 with the highest percentile of unique other computers connecting for the client company's organization, though other host computers 104 associated with other client companies' organizations may have more unique connections and not be in the highest percentile for their organization. In various examples, the threshold for the highest percentile to prioritize host computer(s) as highly connected servers can be predetermined as any percentage within the top 10%, top 5%, top 1%, etc. of the host computers 104 of the client company's organization with the most unique computers connecting over a threshold period of time. In some examples, the threshold percentage can be customizable by the client company's organization. In various examples, the threshold period of time can be predetermined such as a number of hours, days, weeks, months, etc. For example, the period of time can be predetermined as 4 hours, 12 hours, 24 hours, 2 days, 7 days, 2 weeks, 4 weeks, one month, 45 days, 60 days, etc., though these are merely examples, and the dynamic behavior-based asset classification system can accommodate other periods of time. In some examples, the threshold period of time can be customizable by the client company's organization.

FIG. 5 illustrates a flow diagram of an example process 500 of dynamic behavior-based asset classification, as described herein. The example process 500 can be implemented by one or more computing device(s) such as the computing device(s) 102 of FIG. 1, e.g., using software such as modules corresponding to criticality engine 120, prioritization engine 122, and/or behavior-classification model(s) 124 as well as datastore(s) 126 running on such device(s). For the sake of illustration, the example process 500 represents configuring a device to operate as a dynamic behavior-based asset classification system to identify server(s) based on behaviors including remote login(s) and/or inbound connection(s) on particular common port(s), or as a component of such a system.

An operation 502 can include the dynamic behavior-based asset classification system, implemented via distributed computing resources 106, which can include one or more processing units 112 in one or more computer(s) 102 including criticality engine 120, being configured to determine or determining, based on data associated with a particular host computer 104, a number of unique non-local accounts, e.g., non-local user accounts, non-local computer accounts, etc., that have logged in to the host computer(s) 104 is above a third threshold. For example, a host computer 104 not configured as a server, and instead being a computer or asset otherwise configured, such as configured as a workstation, e.g., an employee's in-office computer, an employee's laptop computer, a vendor's machine on a private network, another type of computing asset, etc., generally would be expected to have few to no unique non-local accounts, e.g., non-local user accounts, non-local computer accounts, etc., that have logged in to the host computer(s) (e.g., remote logins). Thus, if data from the respective machine 104, shows one to numerous unique non-local accounts, e.g., non-local user accounts, non-local computer accounts, etc., that have logged in to the host computer(s), e.g., a number of unique non-local accounts, e.g., non-local user accounts, non-local computer accounts, etc., that have logged in to the host computer(s) above the threshold, the dynamic behavior-based asset classification system can determine that the machine is behaving like a server, e.g., a webserver, a DHCP server, etc., even though the specification data may not state that the host machine 104 is a server. In at least one example, the criticality engine 120 can determine that the host computer 104 is a server based on the number of unique non-local accounts, e.g., non-local user accounts, non-local computer accounts, etc., that have logged in to the host computer(s) 104 relative to the frequency of unique non-local accounts, e.g., non-local user accounts, non-local computer accounts, etc., that have logged in to other computers across the client company's organization.

An operation 504 can include the dynamic behavior-based asset classification system, implemented via distributed computing resources 106, which can include one or more processing units 112 in one or more computer(s) 102 including criticality engine 120, being configured via criticality engine 120 to determine or determining that the host computer(s) 104 has had an inbound connection on a common port based on data associated with the host computer 104. For example, a host computer 104 not configured as a server, and instead being a computer or asset otherwise configured, such as configured as a workstation, e.g., an employee's in-office computer, an employee's laptop computer, a vendor's machine on a private network, another type of computing asset, etc., generally would be expected to have few to no connections from other computers on certain common ports. Thus, if data from the respective machine 104, shows connections on one or more of the common ports, e.g., connections on one or more of ports 22, 443, 80, 8080, 25, 53, 3389, 143, 993, and/or 587, the dynamic behavior-based asset classification system can determine that the machine is behaving like a server, e.g., a webserver, a DHCP server, etc., even though the specification data may not state that the host machine 104 is a server. In at least one example, the criticality engine 120 can determine that the host computer 104 is a server based on the connections on one or more of ports 22, 443, 80, 8080, 25, 53, 3389, 143, 993, and/or 587 of the host computer 104 relative to the frequency of connections to other computers across the client company's organization.

An operation 506 can include the dynamic behavior-based asset classification system, implemented via distributed computing resources 106, which can include one or more processing units 112 in one or more computer(s) 102, being configured via prioritization engine 122 to identify or identifying that behavior associated with the host computer(s) 104 includes the number of unique non-local accounts, e.g., non-local user accounts, non-local computer accounts, etc., that have logged in to the particular host computer 104 is above the third threshold and/or that the particular host computer 104 has had at least one inbound connection on at least one of the common ports. In some examples, the prioritization engine 122 can prioritize patching vulnerabilities on host computer 104 based on a single unique non-local account, e.g., non-local user account, non-local computer account, etc., having logged in to the particular host computer 104 and that the particular host computer 104 has had a single inbound connection on one of the common ports.

In at least one example, the prioritization engine 122 can prioritize patching vulnerabilities on host computer 104 based on a calculation of unique non-local account, e.g., non-local user accounts, non-local computer accounts, etc., having logged in to the particular host computer 104 relative to other host computers within the client company's organization and/or based on a calculation of inbound connections on one of the common ports of the particular host computer 104 relative to other host computers within the client company's organization. Thus, the prioritization engine 122 of the dynamic behavior-based asset classification system can be configured to prioritize the host computer(s) 104 with the highest percentile of a combined metric based on non-local account, e.g., non-local user accounts, non-local computer accounts, etc., logins and connections to common ports for the client company's organization, though other host computers 104 associated with other client companies organizations may have more connections and not be in the highest percentile for their organization. In various examples, the threshold for the highest percentile to prioritize host computer(s) as servers can be predetermined as any percentage within the top 10%, top 5%, top 1%, etc. of the host computers 104 of the client company's organization with the most non-local account, e.g., non-local user accounts, non-local computer accounts, etc., logins and connections to common ports over a threshold period of time. In some examples, the threshold percentage can be customizable by the client company's organization. In various examples, the threshold period of time can be predetermined as a number of hours, days, weeks, months, etc. For example, the period of time can be predetermined such as 4 hours, 12 hours, 24 hours, 2 days, 7 days, 2 weeks, 4 weeks, one month, 45 days, 60 days, etc., though these are merely examples, and the dynamic behavior-based asset classification system can accommodate other periods of time. In some examples, the threshold period of time can be customizable by the client company's organization.

Illustrative Components

Figure 6:
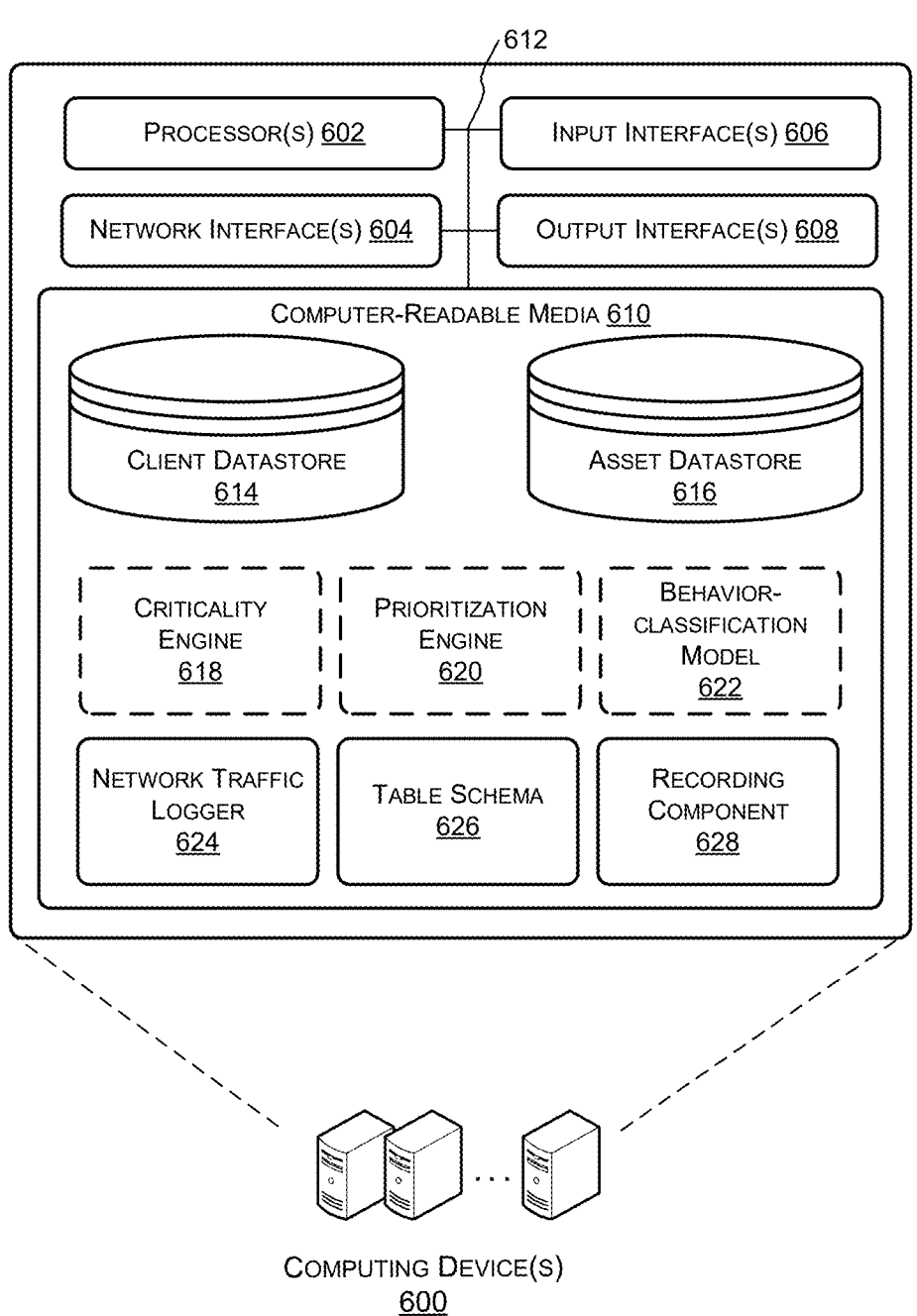
FIG. 6 is a block diagram of an illustrative computing architecture showing example hardware components for a computing device that can implement the dynamic behavior-based technology and techniques described herein.

FIG. 6 is a block diagram of an illustrative configuration of components of a computing architecture of the computing device(s) 600. In some examples, the computing device(s) 600 can correspond to one or more of the device(s) 102 or other components of distributed computing resources 106 of FIG. 1. It is to be understood in the context of this disclosure that the computing device(s) 600 can be implemented as a single device or as a plurality of devices with components and data distributed among them. By way of example, and without limitation, the computing device(s) 600 can be implemented as various computing device 600(1), 600(2), . . . , 600(N) where N is an integer greater than 1.

As illustrated, the example computing device 600 includes one or more processing unit(s) 602, network interface(s) 604, input interface(s) 606, output interface(s) 608, and computer-readable media 610. The components of computing device 600 are operatively connected, for example, via a bus 612. These components can represent corresponding components from device(s) 102 a, e.g., processing unit(s) 602 can represent processing unit(s) 112, bus 612 can represent bus 116, etc.

In example computing device 600, processing unit(s) 602 can correspond to processing unit(s) 112, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In some examples, processing unit(s) 602 can include an on-board memory, e.g., a RAM and/or cache, not shown.

Network interface(s) 604, which can represent communications interface(s) 128, can represent, for example, network interface controllers (NICs) or other types of transceiver devices to send and receive communications over a network.

Input/output (I/O) interfaces 606 and 608 allow computing device 600 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Computer-readable media 610 can correspond to computer-readable media 114 and can store instructions executable by the processing unit(s) 602. Computer-readable media 610 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in computing device 600, while in some examples one or more of a CPU, GPU, and/or accelerator is external to computing device 600.

In the illustrated example, computer-readable media 610 includes two data stores, client datastore 614, which can be configured to store data related to clients of a dynamic behavior-based system as described herein, and asset datastore 516, which can be configured to store an asset-graph database and/or other data associated with a dynamic behavior-based system as described herein. Datastores 614 and 616 can also be represented by datastore 126, FIG. 1. In various examples, client datastore 614 and/or asset datastore 616 can include data storage such as various databases, data warehouses, and/or other type of structured or unstructured data storage (e.g., Structured Query Language, SQL, and/or NoSQL databases), etc. In some examples, client datastore 614 and/or asset datastore 616 can include a corpus and/or a relational database with one or more tables (e.g., produced according to a table schema that is configured to facilitate discovery via a data pipeline), indices, stored procedures, and so forth to enable data access including one or more of hypertext markup language (HTML) tables, resource description framework (RDF) tables, web ontology language (OWL) tables, and/or extensible markup language (XML) tables, for example. Client datastore 614 and/or asset datastore 616 can store data for the operations of processes, applications, components, and/or modules stored in computer-readable media 610 and/or executed by processing unit(s) 602 and/or accelerator(s).

Computing device 600 can implement a criticality engine 618, which generally operates online and can represent criticality engine 120, FIG. 1. In various examples, criticality engine 618 can calculate one or more behavior-based attributes based on data from one or more host computer(s), e.g., host computer(s) 104, FIG. 1.

Example pseudocode for calculating an average number of connections hourly for comparison to a particular host computer associated with a client customer organization follows:

1. Query inbound and outbound connections for a customer's set of assets for a period of time, (e.g., hours, days, weeks, months, etc. such as 1 hour, 4 hours, 12 hours, 24 hours, 2 days, 7 days, 2 weeks, 4 weeks, one month, 45 days, 60 days, etc.).
2. Count total number of connections for each asset by adding the count of inbound and outbound connections for each asset with the data from step 1.
3. With data from step 2, calculate relative percentile rank of total connection counts for each asset relative to all other of the customer's assets.
4. Select assets with a percentile rank above a threshold value (e.g., top 10% means filter on greater than or equal to 0.90, top 5% means filter on greater than or equal to 0.95, top 1% means filter on greater than or equal to 0.99, etc.) and classify those as highly active assets according to the behavior of focus.

Example pseudocode for calculating an average hourly number of connections to determine a highly connected server over an example period of time follows:

1. Query inbound and outbound connections for a customer's set of assets for a period of time, (e.g., hours, days, weeks, months, etc. such as 1 hour, 4 hours, 12 hours, 24 hours, 2 days, 7 days, 2 weeks, 4 weeks, one month, 45 days, 60 days, etc.).
2. Count number of unique assets with which the asset had an inbound or outbound connection for each asset with the data from step 1.
3. With data from step 2, calculate relative percentile rank of unique asset counts for each asset relative to all other of the customer's assets.
4. Select assets with a percentile rank above a threshold value (e.g., top 10% means filter on greater than or equal to 0.90, top 5% means filter on greater than or equal to 0.95, top 1% means filter on greater than or equal to 0.99, etc.) and classify those as highly connected assets according to the behavior of focus.

Example pseudocode for determining that a host computer 104 is behaving as a server based on non-local account, e.g., non-local user accounts, non-local computer accounts, etc., logins and/or has received connections on one or more common ports follows:

1. Query host IDs from logins within a period of time, (e.g., most recent or selected hours, days, weeks, months, etc. such as 1 hour, 4 hours, 12 hours, 24 hours, 2 days, 7 days, 2 weeks, 4 weeks, one month, 45 days, 60 days, etc.) and record (e.g., create first sub-table).
2. Query non-local accounts and record (e.g., create second sub-table).
3. Join the first sub-table and second sub-table to identify logins from non-local accounts and record (e.g., create third sub-table).
4. Query hosts that have at least one incoming connection to a common port and a destination IP address (from those incoming connections) corresponding to a non-local IP address (e.g. not corresponding to 127.0.0.1) and record (e.g., create fourth sub-table).
5. Inner join the records from step 3 and step 4 (e.g., the third sub-table and the fourth sub-table). Filter to identify hosts that have at least a threshold of unique non-local accounts log in and record (e.g., create fifth sub-table).
6. Query the records from step 5 (e.g., the fifth sub-table). Classify those as server assets according to the behavior of focus.

In various examples, computing device 600 can include code, such as the following example pseudocode for determining that a host computer 104 is behaving as a particular server type, e.g., DHCP server type:

1. Query connections to host computers on port 67 or 68 over a period of time, (e.g., most recent or selected hours, days, weeks, months, etc. such as 1 hour, 4 hours, 12 hours, 24 hours, 2 days, 7 days, 2 weeks, 4 weeks, one month, 45 days, 60 days, etc.).
2. Query host IDs from the port connections from step 1.
3. Classify those host computers as DHCP server assets according to the behavior of focus.

In various examples, computing device 600 can include code, such as the following example pseudocode for determining that a host computer 104 is behaving as a particular server type, e.g., DNS server type:

1. Query connections to host computers over a period of time, (e.g., most recent or selected hours, days, weeks, months, etc. such as 1 hour, 4 hours, 12 hours, 24 hours, 2 days, 7 days, 2 weeks, 4 weeks, one month, 45 days, 60 days, etc.) where the connections are over port 53, and record (e.g., create first sub-table).
2. Query managed hosts of Windows or Mac operating systems and record (e.g., create second sub-table).
3. Query managed hosts of operating systems that are neither Windows nor Mac and record (e.g., create third sub-table).
4. Query assets from the applications table where last used file hash is not null and the application name includes "dns server", "quad9", "bind9", "microsoft dns", "named", "power dns", "mara dns", "knot dns", or "unbound" and record (e.g., create fourth sub-table).
5. Query assets from the applications table where architectures is not null and the application name includes "dns server", "quad9", "bind9", "named", "power dns", "mara dns", "knot dns", or "unbound" and record (e.g., create fifth sub-table).
6. Join the first, second, and fourth sub-tables, filtering to Windows and Mac hosts with incoming connections on port 53 and applications related to DNS servers. Filter out hosts believed to be network scanners.
7. Join the first, third, and fourth sub-tables, filtering to non-Windows and non-Mac hosts with incoming connections on port 53 and applications related to DNS servers. Filter out hosts believed to be network scanners.
8. Union the results from step 6 and step 7.

9. Classify those host computers as DNS server assets according to the behavior of focus.

In various examples, computing device 600 can include code, such as the following example pseudocode for determining that a host computer 104 is behaving as a particular server-type, e.g., FTP server type:

1. Query connections to host computers on port 20, 21, 989, or 990 over a period of time, (e.g., most recent or selected hours, days, weeks, months, etc. such as 1 hour, 4 hours, 12 hours, 24 hours, 2 days, 7 days, 2 weeks, 4 weeks, one month, 45 days, 60 days, etc.).

2. Query host IDs from the port connections from step 1.

3. Classify those host computers as FTP server assets according to the behavior of focus.

In various examples, computing device 600 can include code, such as the following example pseudocode for determining that a host computer 104 is behaving as a particular server-type, e.g., SSH server type:

1. Query connections to host computers on port 22 over a period of time, (e.g., most recent or selected hours, days, weeks, months, etc. such as 1 hour, 4 hours, 12 hours, 24 hours, 2 days, 7 days, 2 weeks, 4 weeks, one month, 45 days, 60 days, etc.).

2. Query host IDs from the port connections from step 1.

3. Classify those host computers as SSH server assets according to the behavior of focus.

In various examples, computing device 600 can include code, such as the following example pseudocode for determining that a host computer 104 is behaving as a particular server-type, e.g., Webserver server type:

1. Query connections to host computers on port 22 or 443 over a period of time, (e.g., most recent or selected hours, days, weeks, months, etc. such as 1 hour, 4 hours, 12 hours, 24 hours, 2 days, 7 days, 2 weeks, 4 weeks, one month, 45 days, 60 days, etc.).

2. Query host IDs from the port connections from step 1.

3. Classify those host computers as Webserver type server assets according to the behavior of focus.

Computing device 600 can implement a prioritization engine 620, which generally operates online and can represent prioritization engine 122, FIG. 1.

Computing device 600 can also implement a behavior-classification model 622, which is generally updated incrementally and can represent behavior-classification model 124, FIG. 1.

In some examples, device 600 can implement a network traffic logger 624, which generally operates online and can create a log of inbox network traffic as introduced above regarding FIG. 1, such as by logging connections on common ports, e.g., one or more of ports 22, 443, 80, 8080, 25, 53, 3389, 143, 993, and/or 587. In various examples, device 600 can implement a table schema 626 configured to facilitate discovery via a data pipeline, as introduced above regarding FIG. 1. In some examples, device 600 can implement a recording component 628, configured to record dynamic behavior-based server classifications assigned to particular host computers 104 and/or provide reports of the dynamic behavior-based server classifications to analysts and/or a client associated with the particular host computer 104, as introduced above regarding FIG. 1.

In some examples, computing device 600 can exchange data with computing devices 102 and/or 104 (e.g., servers, desktop computers, laptop computers, hybrid computing devices, tablet computers, smart phones, etc.) via one or more network(s) 108, such as the Internet. In some examples, computing device 600 can detect data from one or more data source(s) (not shown) via one or more network(s)

108. Computing device 600 detecting data representing behavior associated with an individual host device 104 can include computing device 600 receiving data from the one or more sensor(s), sensor console(s), and/or sensor platform(s) associated with individual host devices 104. Example data source(s) can include computing devices 102 and/or 104, sensors, data aggregators, and/or data feeds, e.g., via application programming interfaces (APIs). The processing units 602 can retrieve data from the data source(s), e.g., via an HTTP request such as a GET to a Web Services and/or Representational State Transfer (REST) API endpoint.

CONCLUSION

FIGS. 2, 3, 4, and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example processes of one or more of FIGS. 3, 4, and/or 5 can be combined with the operations illustrated in FIG. 2. Moreover, the methods described herein can be combined in whole or in part with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities can be distributed and divided in different ways, depending on circumstances.

Similarly, software may be stored and distributed in various ways and using different means, and the particular software storage and execution configurations described above may vary in many different ways. Thus, software including instructions to configure a computer to implement the techniques described above can be distributed on various types of computer-readable media, not limited to the forms of memory that are specifically described.

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope of this disclosure with respect to the intended claimed subject matter. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 600 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general-purpose computer(s) and/or processor(s) thereby reconfiguring the general-purpose computer(s) and/or processor(s) as special purpose computer(s) and/or processor(s) during their execution. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples need not include, certain features, elements and/or operations. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or any combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim or clause is a reference to at least some and not necessarily all of the items in the group of items, unless specifically stated otherwise.

What is claimed is:

1. A system comprising:
distributed computing resources, each distributed computing resource including one or more processors for distributedly share resources, balance load, provide fail-over support, and provide redundancy among the distributed computing resources; and
one or more non-transitory computer-readable media storing computer-executable instructions that, when executed, configure the one or more processors of the distributed computing resources to distributedly function to:
detect data representing behavior associated with a host computer;
determine, based on the data associated with the host computer, at least one behavior associated with the host computer;
automatically assign the host computer a server classification, to create an assigned server classification, based on the determination that the at least one behavior associated with the host computer represents a behavior of focus being above a threshold; and
record the assigned server classification associated with the host computer.

2. The system as claim 1 recites, the system further comprising computer-executable instructions that, when executed, further configure the one or more processors to:
determine that the host computer has had a number of connections to other computers associated with a shared customer identifier;
determine whether the number of connections to the other computers associated with the shared customer identifier is above the threshold; and
wherein the at least one behavior associated with the host computer includes the number of connections from a plurality of computers associated with the shared customer identifier being above the threshold and the server classification is assigned based on the number of connections from the plurality of computers being above the threshold indicates the behavior of focus.

3. The system as claim 2 recites, wherein the number of connections includes an average number of connections during a period of time.

4. The system as claim 3 recites, wherein the average number of connections is determined per entity as identified by the shared customer identifier.

5. The system as claim 3 recites, wherein the period of time is an hour.

6. The system as claim 3 recites, wherein:
the period of time is a first period of time; and
the threshold represents a threshold percentage corresponding to the plurality of computers associated with the shared customer identifier that have had a network connection in a second period of time.

7. The system as claim 1 recites, wherein the threshold is a first threshold, the system further comprising computer-executable instructions that, when executed, configure the one or more processors to:
determine, based on the data associated with the host computer, a number of unique other host computers connecting to the host computer;
determine whether the number of unique other host computers connecting to the host computer is above a second threshold; and
wherein the at least one behavior associated with the host computer includes the number of unique other host computers connecting to the host computer being above the second threshold and the server classification is assigned based on the number of unique other host computers connected to the host computer being above the second threshold indicates the behavior of focus.

8. The system as claim 7 recites, wherein the number of unique hosts connecting is based on connections from unique hosts during a period of time.

9. The system as claim 8 recites, wherein the period of time is a period of seven days.

10. The system as claim 9 recites, wherein the second threshold represents a percentage corresponding to at least one of: a top 10%, a top 5%, or a top 1%, of a plurality of computers associated with a shared customer identifier that have had a network connection during a period of time.

11. The system as claim 1 recites, wherein the threshold is a first threshold, the system further comprising computer-executable instructions that, when executed, configure the one or more processors to:

determine, based on the data associated with the host computer, a number of unique non-local accounts that have logged in to the host computer is equal to or greater than a third threshold;

determine, based on the data associated with the host computer, that the host computer has had an inbound connection on a common port; and wherein the at least one behavior associated with the host computer includes the number of unique non-local accounts that have logged in to the host computer being equal to or greater than the third threshold and that the host computer has had the inbound connection on the common port and the server classification is assigned based on the number of unique non-local accounts that have logged in to the host computer being equal to or greater than the third threshold and that the host computer has had the inbound connection on the common port, which indicates the behavior of focus.

12. The system as claim 11 recites, wherein the system is configured to determine the number of unique non-local accounts that have logged in to the host computer over a predefined period of time.

13. The system as claim 11 recites, wherein the third threshold is one.

14. The system as claim 11 recites, wherein the common port is one of a plurality of common ports including one or more of port 22, port 443, port 80, port 8080, port 25, port 53, port 3389, port 143, port 993, or port 587.

15. The system as claim 11 recites, the system further comprising computer-executable instructions that, when executed, further configure the one or more processors to classify the host computer as one or more subtypes of servers including:

a dynamic host configuration protocol (DHCP) server based on the host computer having at least one inbound connection on port 67 or port 68 that is not a broadcast connection;

a domain name system (DNS) server based on the host computer having at least one of:
an inbound connection on port 53,
at least one application installed including a predetermined word in a name of the host computer, or
less than a predetermined percentage of sources that are scanners;

a file transfer protocol (FTP) server based on the host computer having at least one inbound connection on port 21, port 20, port 989, or port 990;

a secure shell host (SSH) server based on the host computer having at least one inbound connection on port 22; or a web server based on the host computer having:
at least one inbound connection on port 80 or port 443, and
less than a predetermined percentage of sources that are scanners.

16. A non-transitory computer-readable medium comprising:

an interface configured to operably connect the non-transitory computer-readable medium to one or more processors of distributed computing resources, each distributed computing resource including one or more processors for distributedly share resources, balance load, provide fail-over support, and provide redundancy among the distributed computing resources; and instructions stored on the non-transitory computer-readable medium and executable by the one or more processors of the distributed computing resources, the instructions, when executed, to configure the one or more processors of the distributed computing resources to distributedly perform operations comprising:

detect data associated with a host computer;

determine, based on the data associated with the host computer, at least one behavior associated with the host computer;

automatically assign the host computer a server classification based on the determination that the at least one behavior associated with the host computer represents a behavior of focus being above a threshold; and record the server classification associated with the host computer.

17. The non-transitory computer-readable medium as claim 16 recites, the instructions, when executed, to configure the one or more processors to distributedly perform operations further comprising at least one of: to identify a number of connections, to identify a number of unique other hosts connecting, or to identify the host computer as an asset operating as a server:

identify the number of connections by:
determining that the host computer has had a number of connections to other computers associated with a shared customer identifier;
determining whether the number of connections to other computers associated with the shared customer identifier is above the threshold, wherein the threshold is a first threshold; and
wherein the at least one behavior associated with the host computer includes the number of connections to a plurality of computers associated with the shared customer identifier being above the first threshold;

identify the number of unique other hosts connecting by:
determining, based on the data associated with the host computer, a number of unique other host computers connecting to the host computer;
determining whether the number of unique other host computers connecting to the host computer is above a second threshold; and
wherein the at least one behavior associated with the host computer include the number of unique other host computers connecting to the host computer being above the second threshold; and identify the host computer as the asset operating as the server by:

determining, based on the data associated with the host computer, a number of unique non-local accounts that have logged in to the host computer is above a third threshold;

determining, based on the data associated with the host computer, that the host computer has had an inbound connection on a common port;

wherein the at least one behavior associated with the host computer include the number of unique non-local accounts that have logged in to the host computer being above the third threshold and that the host computer has had the inbound connection on the common port.

18. A system comprising:

one or more processors; and an interface configured to communicatively couple the one or more processors to the non-transitory computer-readable medium as claim 17 recites.

19. A method, performed by distributed computing resources, each distributed computing resource including one or more processors for distributedly share resources, balance load, provide fail-over support, and provide redundancy among the distributed computing resources, comprising:

receiving data associated with a host computer;

determining, based on the data associated with the host computer, at least one behavior associated with the host computer;

automatically assigning the host computer a server classification based on the determination that the at least one behavior associated with the host computer represents a behavior of focus being above a threshold; and recording the server classification associated with the host computer.

20. The method as claim 19 recites, further comprising at least one of: identifying a number of connections, identifying a number of unique other hosts connecting, or identifying the host computer as an asset operating as a server:

identifying the number of connections by:

determining that the host computer has had a number of connections to other computers associated with a shared customer identifier;

determining whether the number of connections to the other computers associated with the shared customer identifier is above the threshold, wherein the threshold is a first threshold; and wherein the at least one behavior associated with the host computer includes the number of connections to a plurality of computers associated with the shared customer identifier being above the first threshold;

identifying the number of unique other hosts connecting by:

determining, based on the data associated with the host computer, a number of unique other host computers connecting to the host computer;

determining whether the number of unique other host computers connecting to the host computer is above a second threshold; and wherein the at least one behavior associated with the host computer include the number of unique other host computers connecting to the host computer being above the second threshold; and identifying the host computer as the asset operating as the server by:

determining, based on the data associated with the host computer, a number of unique non-local accounts that have logged in to the host computer is above a third threshold;

determining, based on the data associated with the host computer, that the host computer has had an inbound connection on a common port; and wherein the at least one behavior associated with the host computer include the number of unique non-local accounts that have logged in to the host computer being above the third threshold and that the host computer has had the inbound connection on the common port.

* * * * *